United States Patent [19]
Kwolek

[11] Patent Number: 5,515,950
[45] Date of Patent: May 14, 1996

[54] DISC BRAKE FRICTION PAD ASSEMBLY

[75] Inventor: John P. Kwolek, Cross Junction, Va.

[73] Assignee: Pneumo Abex Corporation, Hampton, N.H.

[21] Appl. No.: 257,505

[22] Filed: Jun. 8, 1994

[51] Int. Cl.[6] ........................... F16D 69/00
[52] U.S. Cl. .................... 188/73.36; 188/250 E; 188/250 B; 188/251 A
[58] Field of Search ............ 188/250 R, 251 R, 188/250 E, 250 B, 264 G, 258, 73.1, 73.35, 73.36, 73.31, 251 A, 73.37

[56] References Cited

U.S. PATENT DOCUMENTS

| | | | |
|---|---|---|---|
| 3,490,563 | 1/1970 | Hahm | 188/264 G |
| 3,966,026 | 6/1976 | Filderman | 188/73.1 X |
| 5,407,034 | 4/1995 | Vydra et al. | 188/250 B X |

FOREIGN PATENT DOCUMENTS

| | | | |
|---|---|---|---|
| 3109992 | 9/1982 | Germany | 188/250 E |
| 3734289 | 4/1989 | Germany . | |
| 0599326 | 7/1982 | Japan . | |
| 0192639 | 11/1982 | Japan | 188/251 A |
| 0049028 | 3/1987 | Japan | 188/264 G |
| 0093527 | 4/1987 | Japan | 188/73.1 |
| 0106132 | 5/1987 | Japan | 188/73.1 |
| 3013329 | 7/1993 | WIPO | 188/250 E |

Primary Examiner—Robert J. Oberleitner
Assistant Examiner—Peter M. Poon
Attorney, Agent, or Firm—Thomas S. Baker, Jr.

[57] ABSTRACT

An improved disc brake friction pad assembly is provided with a metallic backing plate element, a friction pad element, and a noise-dampening shim subassembly positioned intermediate the backing plate element and the friction pad element.

2 Claims, 2 Drawing Sheets

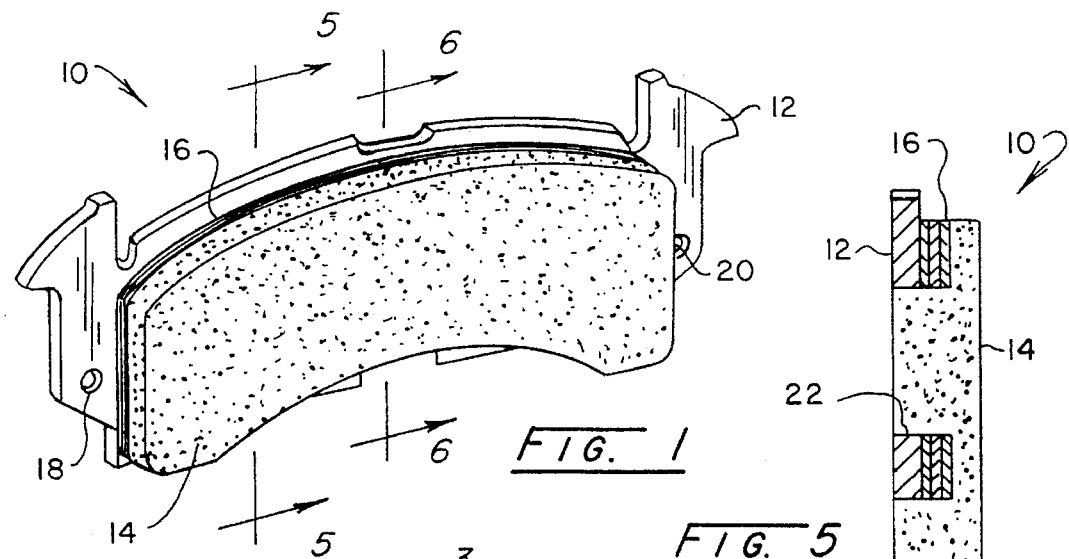
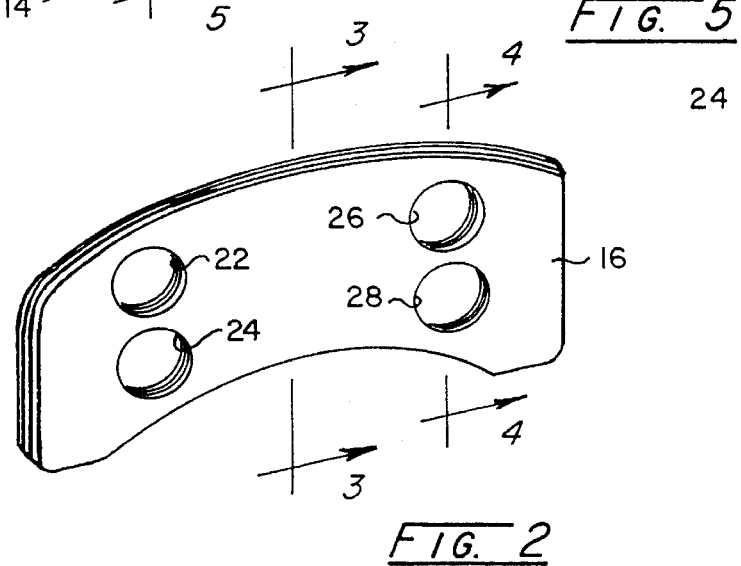
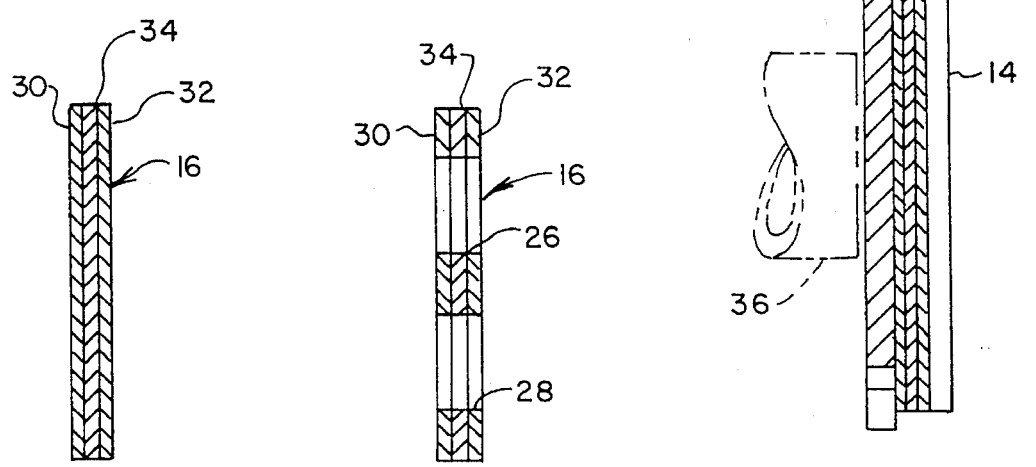

DISC BRAKE FRICTION PAD ASSEMBLY

FIELD OF THE INVENTION

This invention relates generally to automobile braking systems, and particularly concerns an improved disc brake friction pad assembly for utilization in such systems to generate effective friction forces with reduced noise during system braking operation.

BACKGROUND OF THE INVENTION

The use of noise dampening material in combination with a brake friction material and a metallic support element is well-known as disclosed by U.S. Pat. No. 4,240,530 issued in the name of Tillenburg. Such patent teaches a disc brake friction pad assembly comprised of a multi-part metallic carrier plate and a friction material cure-bonded to one face of the carrier plate. The carrier plate part joined to the friction material is bonded to another similarly-configured carrier plate part by a cured rubber-asbestos dampening material. Another publication, Japanese Patent No. 62-106132 issued in the name of Kani to Toyota, discloses the same type of brake friction pad assembly in which the carrier plate parts are preferably made of a bainite cast iron material. The elasticity (dampening material) layer which joins the carrier plate parts together is unspecified by the Japanese publication.

U.S. Pat. No. 3,966,026 issued in the name of Filderman teaches a braking member construction in which a noise reduction capability is obtained through use of a friction material support that is comprised of a stack of thin metallic sheets or strips, contiguous to each other over their whole surface and all assembled together by gluing, welding in zones, riveting, insetting in a rim or flange, or the like. The nature of the glue is not specified. See also U.S. Pat. No. 4,064,975 issued in the name of the same Filderman for another disclosure of the braking member construction.

U.S. Pat. No. 4,022,302 issued in the name of Janssen teaches that brake noise reduction may be achieved by coating the exterior surface of the brake support plate with a thin layer of vulcanized latex.

A further teaching of a disc brake pad assembly utilizing a noise dampening material in combination with a metallic support plate (brake shoe) and a friction material is U.S. Pat. No. 4,373,615 issued in the name of Melinat. In the Melinat assembly a semi-metallic friction material is secured to a multi-part metallic brake shoe comprised of bonded metallic, ceramic, and elastomeric (rubber) layers.

U.S. Pat. No. 5,083,643 issued in the name of Hummel et al. and assigned to the assignee of this application, discloses the use of a noise dampening material in the construction of a drum brake friction block and shoe assembly. Such dampening material is essentially an elastomer and is formed into separate segments that are positioned in correspondingly configured grooves located in the friction material block.

For a teaching of the use of an elastomeric sound dampening material in a railway disc brake see Germany Patent No. DE 3734289-A. For a teaching of the use of a flexible graphite sheet layer in a disc brake pad assembly which appears to function more as a heat barrier rather than a noise reduction device see Japan Patent No. 59-9326(A) issued in the name of Maruya and assigned to Nissan.

SUMMARY OF THE INVENTION

The disc brake friction pad assembly of the instant invention is comprised of a friction pad element, a metallic backing plate element, and a particularly-positioned, noise-dampening shim subassembly comprised of an elastomeric material lamina sandwiched between and bonded to spaced-apart metallic laminae. It is important to the practice of this invention that the shim subassembly be positioned intermediate the friction pad element and the backing plate element, so that the co-operating braking system actuating piston will make direct contact with the assembly metallic backing plate element during system operation and not directly contact the noise-dampening shim subassembly. Each of the metallic laminae of the shim subassembly preferably are of considerably less thickness than the thickness of the metallic backing plate member. The force applied by the system actuating piston directly to the backing plate element is effectively distributed over the shim subassembly planform extent to thus eliminate the presence of concentrated stresses in the shim subassembly. The noise-dampening shim subassembly may be incorporated into the disc brake friction pad assembly by either integral molding, adhesive bonding, riveting, threaded fastening or a combination of such procedures.

This invention obtains superior noise reduction in an operating automotive braking system over the performance of any of the known disc brake friction pad assemblies exemplified by the prior art. Other advantages associated with this invention will become apparent from consideration of the drawings and detailed description which follow.

DESCRIPTION OF THE DRAWING

FIG. 1 is an orthogonal view of a preferred embodiment of the disc brake friction pad assembly of the instant invention;

FIG. 2 is an orthogonal view of the noise-dampening shim subassembly which is incorporated into the disc brake friction pad assembly of FIG. 1;

FIG. 3 is a sectional view of the shim subassembly of FIG. 2 taken along line 3—3 of FIG. 2;

FIG. 4 is a sectional view of the shim subassembly of FIG. 2 taken along line 4—4 of FIG. 2;

FIG. 5 is a sectional view of the preferred disc brake friction pad assembly of FIG. 1 taken along line 5—5 of FIG. 1;

FIG. 6 is a sectional view of the preferred disc brake friction pad assembly of FIG. 1 taken along line 6—6 of FIG. 1;

DETAILED DESCRIPTION

Figure 7:
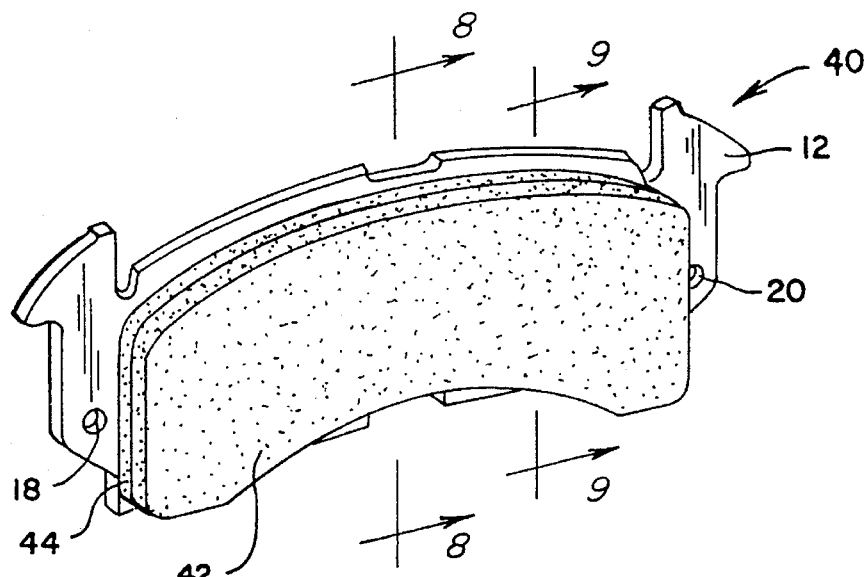
FIG. 7 is an orthogonal view of an alternate embodiment of the present invention incorporating the noise-dampening shim subassembly of FIG. 2 in a completely embedded condition.
Figure 8:
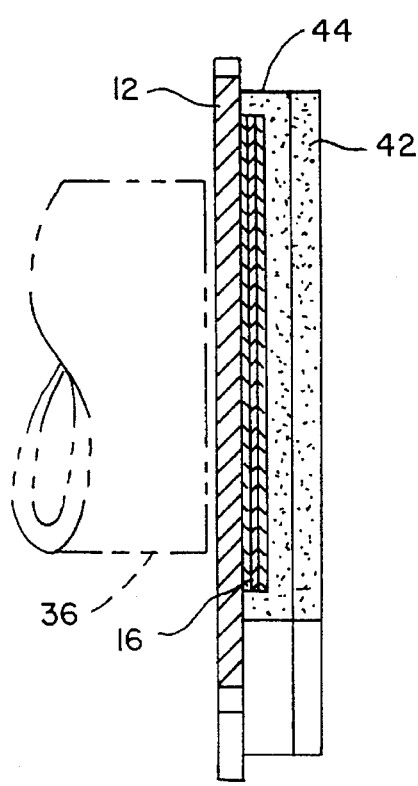
FIG. 8 is a sectional view of the alternate embodiment of FIG. 7 taken along line 8—8 of FIG. 7.
Figure 9:
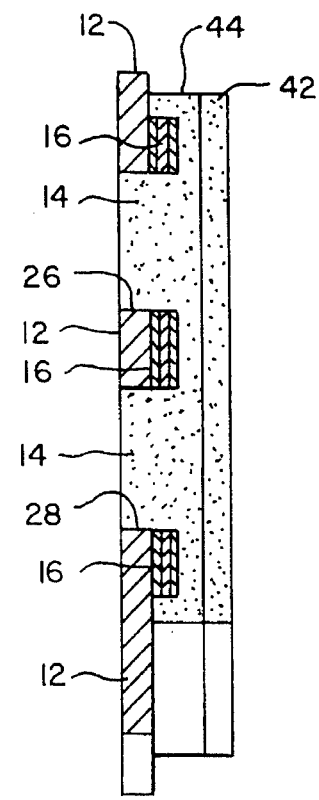
FIG. 9 is a sectional view of the alternate embodiment of FIG. 7 taken along line 9—9 of FIG. 7.

FIG. 1 illustrates a preferred embodiment of the instant invention. A disc brake friction pad assembly (10) is comprised essentially of a metallic backing plate element (12), a friction material pad or block element (14), and a noise-dampening shim subassembly (16) positioned intermediate elements (12 and 14). Backing plate element (12), sometimes referred to in the art as a support element, a mounting plate, or a brake shoe element, preferably is manufactured of a low-carbon steel and is provided with a retaining means for structurally incorporating assembly (10) into an automobile brake system—usually at each brake system brake caliper assembly in the case of a disc brake system. In backing plate element (12) the retaining means is a hole pair, (18 and 20), which co-operates with correspondingly placed mounting pins (not shown) provided in a brake system caliper assembly.

Friction pad (14) in the FIG. 1 embodiment is comprised of a molded, low heat-transfer, friction material. An example of a satisfactory low heat-transfer friction material is a particulate mixture with a formulation comprised of: approximately 12 weight percent cashew nut shell particles or rubber particles, or a combination thereof, approximately 12 weight percent straight and/or modified two-step phenolic resin binder particles, approximately 15 weight percent of carbonaceous material (graphite, coke, carbon black), approximately 15 weight percent fibers (Aramid, polyacrylonitrile and fiber glass), and 46 weight percent minerals and fillers (magnesium oxide, silica, rottenstone and barytes). All constituent ingredients of the composition are thoroughly and uniformly mixed prior to use in molding element (14).

Subassembly (16) illustrated in FIG. 2 is a laminated assembly comprised of an elastomeric material layer (34) sandwiched between metallic laminae (30 and 32). Each of laminae is preferably fabricated of a conventional high-carbon steel material or other suitable metal. In thickness each of laminae (30, 32) is significantly thinner than the thickness of backing plate element (12). Elastomeric material layer (34) is a molded component and provides a sound or noise-dampening capability in assembly (10). Materials forming lamina (34) preferably are noise dampening. These may include acrylic, nitrile rubber, proprietary elastomeric layers (from Palmer International) or viscoelastic materials.

Referring again to FIG. 2, assembled subassembly (16) components 30, 32, and 34 are each provided with registering spaced-apart holes (22 through 28) adapted to receive friction material of friction pad (14) to assist in securing pad (14) and shim subassembly (16) to backing plate (12). It is important to note that noise-dampening shim subassembly (16) in part also functions as a thermal barrier to minimize the transfer of heat during brake system braking operation from friction material (14) which may have a semi-metallic composition to backing plate element (12), especially to that region of element (12) which is contacted by the face of the brake system caliper assembly actuating piston (36) shown schematically (FIG. 6). For this reason it is important that the lateral separation of hole pair (22, 24) from hole pair (26, 28) be greater than the diameter of piston (36).

It is preferred that metallic laminae (30 and 32) be bonded to the faces of noise-dampening material layer (34) by a suitable polymeric adhesive. Such a suitable adhesive may be either of the two commercially-available synthetic rubber elastomeric adhesives marketed in the United States under the trade names "Cycle Weld" or "Plastilock" by B. F. Goodrich Company of Akron, Ohio. It is preferred that the adhesive be applied as an evenly distributed film over the faces of element (34) so as to have a cured adhesive film thickness of from approximately 0.0003 inch to approximately 0.0015 inch. After air-drying to remove included solvents the adhesive films on the surfaces of lamina (34) should be thermally cured by heating to a temperature in the range of 350 degrees Fahrenheit to 400 degrees Fahrenheit for a period of from 3 hours to 1 hour, respectively. See also the above cited U.S. Pat. Nos. 4,240,530 and 5,083,643 issued in the names of Tillenburg and Hummel et al., respectively, for additional disclosures of adhesives suitable for the practice of this invention. Also, it should be noted that an elastomeric adhesive film is preferably applied also to each exterior metallic face of shim subassembly (16) before that component is finally incorporated into assembly (10).

Base plate element (12), shim subassembly (16), and the particulate friction material mixture which will comprise friction pad element (14) are combined into an integrated assembly (10) using conventional mold apparatus preheated to a temperature of approximately 320 degrees Fahrenheit. Base plate element (12) is placed first at the bottom of the mold apparatus compression cavity which has a cavity bottom planform basically corresponding to the planform of base element (12). An insert having an outer planform or configuration essentially corresponding to the lateral extent of the mold apparatus and an open interior with a planform corresponding to the configuration of the exterior peripheral edge of shim subassembly (16) is placed in the mold apparatus cavity upon base plate member (12). Care should be taken that all of holes (22 through 28) in shim subassembly (16) and base plate member (12) are in proper registration.

The required amount of particulate mixture for forming element (14) with the necessary curing agents included, is then placed into the mold apparatus cavity and evenly distributed over the upper surface of shim subassembly (16) before mold apparatus closure. Initially the particulate material is compressed by the mold apparatus compression member by applying sufficient force to develop an interior isostatic compression pressure of approximately 2000 pounds per square inch throughout the particulate mixture. The filled cavity interior should be vented to the atmosphere for prescribed times to remove gases formed following initial mold closure. Thereafter, the compression forces are preferably increased to a level that will produce an isostatic compression pressure of approximately 3000 to 5000 pounds per square inch in the compressed mixture and that level of compression is preferably maintained for a period of at least approximately 2 minutes or until the binder is fully cured and the adhesives partially cured.

Lastly, the so-compressed and partially heated assembly (10) is ejected from the mold apparatus and subsequently transferred to a curing oven to be heat cured by raising the friction material temperature linearly to approximately 350 degrees Fahrenheit over a 3-hour time period and then maintaining the heated assembly at the 350 degree Fahrenheit temperature for an additional 4 hours of process time.

The embodiment of the invention disclosed in FIGS. 7 through 10 as disc brake friction pad assembly (40) differs from assembly (10) of FIGS. 1 through 6 in several respect although it does utilize the same backing plate member (12) and the same noise-dampening shim subassembly (16) in its construction. The basic difference is that the low heat-transfer friction material used for forming pad (14) of FIGS. 1 through 6 is replaced by a composite material comprised of a semi-metallic friction material facing (42) integrally bonded to a more extrudable backing material portion designated (44).

An example of a typical semi-metallic friction material satisfactory for use in forming element (42) of the FIG. 7 embodiment friction pad is a particulate mixture having the following formulation: approximately 5 parts barite particles, approximately 1 part rubber particles, approximately 21 parts carbonaceous particles, (coke, graphite, carbon), approximately 57 parts iron and steel particles (with at least 5% being steel fibers), approximately 5 to 15 parts phenolic resin binder, the remainder being fillers such as magnesium oxide, all constituent parts being on a percentage parts by weight basis.

A typical extrudable backing material satisfactory for use in forming element (44) of the FIG. 7 embodiment friction pad may comprise up to 40 parts of elastomeric material such as latex, nitrile rubber or tire peels, 10 to 40 parts barite, 20 to 50 parts fibrous materials such as Aramid, glass fibers, steel wool or wollastonite, and 10 to 25 parts resin particles, all constituent parts being on a percentage parts by weight basis.

The preferred procedure for fabricating disc brake friction pad assembly (40) generally parallels the procedure detailed above regarding the fabrication of assembly embodiment (10). One of the principal differences is that the mold apparatus cavity insert has an open interior peripheral edge planform that is uniformly larger than the planform of the periphery of shim subassembly (16) so that upon completion of the molding operation the peripheral edge of the shim subassembly is completely embedded in or surrounded by backing material (44). In addition, the particulate materials for forming elements (42 and 44) of the assembly friction pad component are placed in the mold apparatus compression cavity in two stages. First the material (44) is put into the mold cavity on and uniformly distributed over the upper face of the properly positioned shim subassembly (16). Afterwards, the required amount of friction material (42) is uniformly distributed over the surface of the previously evenly distributed composition (44). The mold apparatus is then closed and the curing process may proceed as discussed above.

Disc brake friction pad assemblies (10 and 40) illustrated in the drawings and described above each utilize a thermally cured elastomeric adhesive applied to the exterior faces of noise-dampening shim subassembly (16) to integrally bond such subassembly to both the backing plate element and the assembly friction material or noise-dampening backing material but other means for securing subassembly (16) into the completed disc brake friction pad assembly are contemplated. For instance, it is possible to incorporate such subassembly into the completed product by use of appropriately configured and located rivets or threaded fasteners.

Other materials, component shapes, and component sizes than those specified in the drawings and detailed description may be utilized in the practice of this invention without departing from the scope of the subsequent claims.

I claim my invention as follows:

1. A bonded disc brake friction pad assembly for incorporation into an automotive vehicle brake system in combination with a cooperating and relatively movable hydraulic brake actuator, and comprising:

a molded friction pad member;

a metallic backing plate member having a first surface and an additional and separate exterior actuator contact surface;

a shim subassembly comprised of alternating metallic and elastomeric material laminae and having a first exterior surface contacting said backing plate member first surface and a second exterior surface contacting said friction pad member;

assembly retaining means located in said metallic backing plate member; and said friction pad member being comprised of a molded noise-dampening material composition portion contacting said shim subassembly second exterior surface and of a molded semi-metallic friction material composition portion contacting and integrally molded with said molded noise-dampening material composition portion.

2. The disc brake friction pad assembly of claim 1 wherein said shim subassembly further comprises a peripheral edge; and wherein said molded noise-dampening material composition portion completely surrounds said peripheral edge of said shim subassembly.

* * * * *